United States Patent
Jeong et al.

(10) Patent No.: US 11,151,747 B2
(45) Date of Patent: Oct. 19, 2021

(54) CREATING VIDEO AUGMENTED REALITY USING SET-TOP BOX

(71) Applicant: KT CORPORATION, Gyeonggi-do (KR)

(72) Inventors: Yeong-Hwan Jeong, Gyeonggi-do (KR); Yong-Beom Yi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 275 days.

(21) Appl. No.: 16/359,039

(22) Filed: Mar. 20, 2019

(65) Prior Publication Data

US 2020/0302646 A1 Sep. 24, 2020

(51) Int. Cl.
| | |
|---|---|
| G06K 9/00 | (2006.01) |
| G06T 7/90 | (2017.01) |
| G06T 7/194 | (2017.01) |
| G06K 9/32 | (2006.01) |

(52) U.S. Cl.
CPC .............. *G06T 7/90* (2017.01); *G06K 9/3233* (2013.01); *G06T 7/194* (2017.01)

(58) Field of Classification Search
None
See application file for complete search history.

(56) References Cited

U.S. PATENT DOCUMENTS

| | | | |
|---|---|---|---|
| 2019/0325763 A1* | 10/2019 | Hux | A63F 13/5255 |
| 2020/0312033 A1* | 10/2020 | Ohashi | H04N 5/64 |

FOREIGN PATENT DOCUMENTS

| | | | |
|---|---|---|---|
| JP | 07-141493 A | | 6/1995 |
| KR | 10-1343182 B1 | | 12/2013 |
| KR | 10-1349699 B1 | | 1/2014 |
| KR | 10-2017-0006591 A | | 1/2017 |
| KR | 20170006591 A | * | 1/2017 |
| KR | 10-1733125 B1 | | 5/2017 |
| KR | 10-2017-0081361 A | | 7/2017 |

OTHER PUBLICATIONS

Vinayagamoorthy, Vinoba, et al. "Personalising the TV experience with augmented reality technology: Synchronised sign language interpretation." Proceedings of the 2018 ACM International Conference on Interactive Experiences for TV and Online Video. 2018. (Year: 2018).*

Wijnants, Maarten, et al. "A pragmatically designed adaptive and web-compliant object-based video streaming methodology: Implementation and subjective evaluation." Proceedings of the 24th ACM international conference on Multimedia. 2016. (Year: 2016).*

* cited by examiner

*Primary Examiner* — Sean M Conner
(74) *Attorney, Agent, or Firm* — IP Legal Services, LLC

(57) ABSTRACT

Provided is creating an augmented reality video using a set-top box. The set-top box may include a communication circuit and a processor. The communication circuit may be configured to receive a first video stream including a target object image in real time from a server and to receive a second video stream captured by a user device from the user device. The processor may be configured to: extract the target object image from each frame of the first video stream using WebGL, correct a color of a boundary line of the target object image between the target object and the background, and composite the extracted target object image into an each frame of the second video stream.

17 Claims, 5 Drawing Sheets

CREATING VIDEO AUGMENTED REALITY USING SET-TOP BOX

BACKGROUND

The present disclosure relates to creating a video augmented reality using a set-top box.

Augmented Reality (AR) is the technology that expands our physical world, adding layers of digital information onto it. Unlike Virtual Reality (VR), AR does not create the whole artificial environments to replace real with a virtual one.

In general, for creating an AR, various imaging technologies are used for receiving at least two different images (e.g., video streams) from different sources, blending (e.g., synthesizing or compositing) at least one object image from one source with images from the other source. For example, a chroma key technique is one of representative technique for creating AR. Such a chroma key technique has been commonly used for producing broadcasting contents, as an image composition technique. For example, a chroma key technique has been used for a weather forecast broadcasts, a virtual advertisement, motion picture, and video games.

The chroma key technique composites two images or video streams together based on color hues (chroma range). In particular, the chroma key technique composite images with a target subject and a back ground image. For producing a broadcasting contents using the chroma key, a live view of a target subject is captured or photographed in real time in a studio having a blue screen as a background, the captured target subject is extracted in real time, and the extracted target subject image is rendered with a predetermined image (e.g., back ground image). Accordingly, it is a very time-consuming procedure and requires very expensive equipment to produce such AR content.

SUMMARY

In accordance with an aspect of the present embodiment, an augmented reality may be created using a set-top box.

In accordance with another aspect of the present embodiment, an augmented reality video stream may be created using a web graphic library (WebGL).

In accordance with still another aspect of the present embodiment, a set-top box may receive a first video stream from a server, extract an object image from each frame of the first video stream using a WebGL, correct a color of a boundary line of the extracted object image, receive a second video stream from a user device, and composite the corrected object image with each frame of the second video stream.

In accordance with further another aspect of the present embodiment, a set-top may receive a first video stream from a video on demand (VOD) server, receive a second video stream from a user device, and produce AR by rendering the first video stream and the second video stream.

In accordance with one embodiment, a method may be provided for creating a video augmented reality (AR) using a set-top box. The method may include receiving a first video stream including a target object image in real time from a server, receiving a second video stream captured by a user device from the user device, extracting the target object image from each frame of the first video stream using WebGL, correcting a color of a boundary line of the target object image between the target object and the background, and compositing the extracted target object image into an each frame of the second video stream.

A color of the background may be a single color. The correcting may include extracting the boundary line and extracting pixels adjacent to the boundary line.

The correcting may include determining one of a red value, a green value, and a blue value of each pixel corresponding to a RGB value of the background and reducing the determined one by a predetermined rate.

The extracting may include determining a color of each pixel from each frame of the first video stream and extracting the background based on the determination result.

The extracting may include controlling an alpha value of each pixel of the extracted background.

The method may further include outputting the composited video stream as the video augmented reality to a display.

In accordance with another embodiment, a set-top box may be provided for creating a video augmented reality. The set-top box may include a communication circuit configured to receive a first video stream including a target object image in real time from a server and to receive a second video stream captured by a user device from the user device; and a processor configured to: extract the target object image from each frame of the first video stream using WebGL, correct a color of a boundary line of the target object image between the target object and the background, and composite the extracted target object image into an each frame of the second video stream.

In accordance with still another embodiment, a non-transitory computer-readable storage medium storing a program may be provided for performing a method for creating an augmented reality (AR) video using a set-top box. The method may include: receiving a first video stream including a target object image in real time from a server; receiving a second video stream from a user device in real time wherein the second video steam is captured by the user device; extracting the target object image from each frame of the first video stream using web graphics library (WebGL); correcting a color of a boundary line of the target object image between the target object and the background; and creating the AR video by compositing the extracted target object image into an each frame of the second video stream.

DETAILED DESCRIPTION OF EMBODIMENTS

In accordance with at least one embodiment, without using a real-time expensive chroma key system, an augmented reality (AR) may be created using a set-top box. Further, an augmented reality (AR) video stream may be created without converting a chroma key image to an alpha channel image. In particular, a set-top box may receive a first video stream from a server, extract an object image from each frame of the first video stream using a WebGL, correct a color of a boundary line of the extracted object image, receive a second video stream from a user device, and composite the corrected object image with each frame of the second video stream. That is, a set-top may receive a first video stream from a video on demand (VOD) server, receive a second video stream from a user device, and produce an AR video stream by rendering the first video stream and the second video stream. Hereinafter, creating such an AR video stream using a set-top box and a WebGL will be described with the accompanying drawings.

Figure 1:
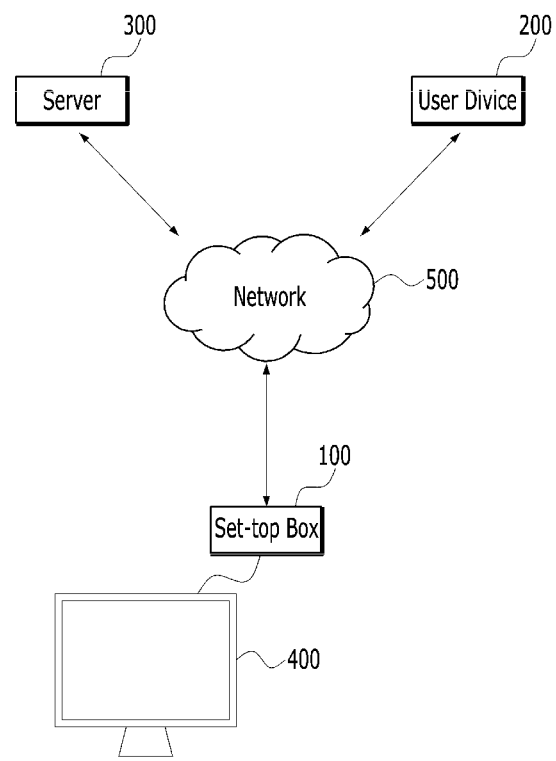
FIG. 1 illustrates creating an augment reality image in real-time using a set-top box in accordance with at least one embodiment of the present disclosure.

FIG. 1 illustrates creating an augment reality video stream using a set-top box in accordance with at least one embodiment of the present disclosure. Referring to FIG. 1, an AR video may be created using set-top box 100, user device 200, and server 300 in accordance with at least one embodiment. Furthermore, the created AR video stream may be displayed through display 400.

As shown in FIG. 1, set-top box 100 may be connected to user device 200 and server 300 through network 500. Network 500 may be a communication network for wirelessly or wiredly connecting nodes (or terminals) to communicate each other. Network 500 may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TIS-PAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto.

Server 300 may be a broadcasting server, a contents server, or a video on demand (VOD) server that broadcasts or provide video contents to subscribers. Server 300 may store a list of produced video streams and provide at least one video stream to a subscriber through a predetermined channel or through a predetermined graphic user interface. In accordance with at least one embodiment, server 300 may store a list of video streams produced by capturing a target object with a single colored background (e.g., blue or green screen). For example, such a video stream may be produced using a chroma key technique. Furthermore, server 300 may store a list of video streams produced by rendering at least one target object with a single color background.

In accordance with at least one embodiment, server 300 may provide information on a list of video streams to set-top box 100, receive a selection signal from set-top box 100 to select at least one video stream, and provide the selected video stream to set-top box 100 based on the selection signal through a dedicated channel.

User device 200 may be an electron device capable of communicating with other devices through network 400, storing images and streams, capturing images, and generating video streams based on the captured images. For example, user device 200 may include a laptop computer equipping a camera, a desktop personal computer equipping a camera, and a mobile device equipping a camera. Such a mobile device may include a smart phone, a tablet PC, a wearable device, an artificial intelligent (AI) device (e.g., Giga Genie®, Amazon echo Show®, or Google Home®), and any portable devices equipping a camera and communication modules of Bluetooth (BLE: Bluetooth low energy), NFC, RFID, Ultrasonic, infrared, WiFi, LiFi, and so forth.

In accordance with at least one embodiment, user device 200 may be installed with a predetermined application (e.g., software program or APP) for enabling a user to capture images, creating a video stream, and transmitting the created video stream in real time to set-top box 100 in response to a user input. User device 200 may provide a dedicated graphic user interface to control set-top box 100. Furthermore, user device 200 may provide another dedicated user interface for creating an AR video stream in response to user inputs.

Set-top box 100 may be a device that converts video content to analog or digital TV signal. Such set-top box 100 may generally contain a TV-tuner input and displays output to a display (e.g., a television set) and an external source of signal, turning the source signal into content in a form that then be displayed on the display. Set-top box 100 may be used cable television, satellite television, and over-the-air television system.

In accordance with at least one embodiment, set-top box 100 may create an augmented reality video stream in response to a user request and output the created augmented reality video stream through display 400. Set-top box 100 may generate and display a graphic user interface on display 400 in order to show a list of video streams stored in server 300 and/or stored in user device 200 for creating an augmented reality video stream. Through the user interface, a user is enabled to create an augmented reality video stream using video streams stored in server 300 and another video stream captured or stored in user device 200.

In accordance with at least one embodiment, set-top box 100 may receive a first video stream including an image of a target object from server 300. The first video stream may be a video stream produced by capturing the target object in front of a blue color background or a green color background or a video stream produced by rendering an image of the target object with a predetermined single color background.

Set-top box 100 may receive a second video stream produced or captured in real time by user device 200. In another embodiment, set-top box 100 may directly capture a second video stream using a camera equipped within set-top box 100 in response to a user input. The second video stream may be a live image capturing by the camera or images captured previously.

Set-top box 100 may extract an image of a target object from each frame of the first video stream using a WebGL and composite (e.g., render) the extracted target object image into each frame of the second video stream. Set-top box 100 may correct a color of a boundary line (e.g., edge line) of the extracted object image and composite the corrected image into the second video stream in accordance with at least one embodiment.

Figure 2:
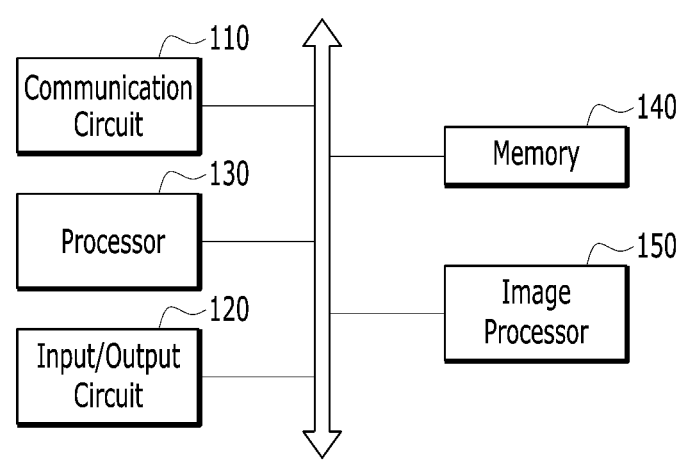
FIG. 2 is a block diagram illustrating a set-top box in accordance with at least on embodiment of the present disclosure.
Figure 3:
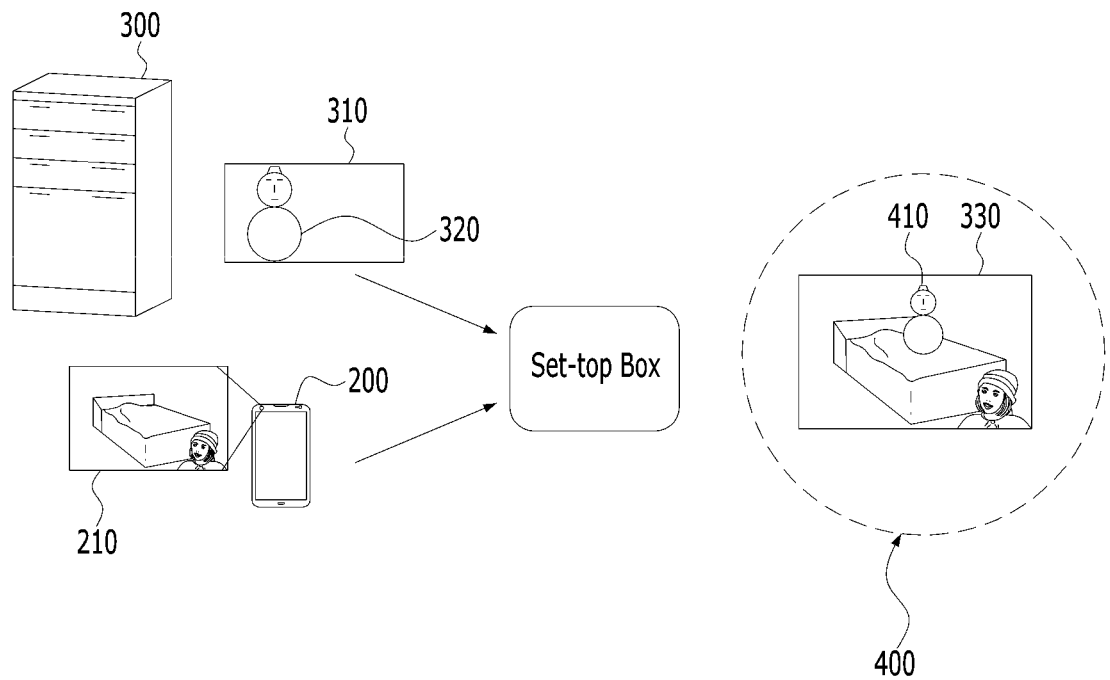
FIG. 3 is a diagram for explaining a method for creating an augment reality image in real time using a set-top box in accordance with at least one embodiment of the present disclosure.
Figure 4:
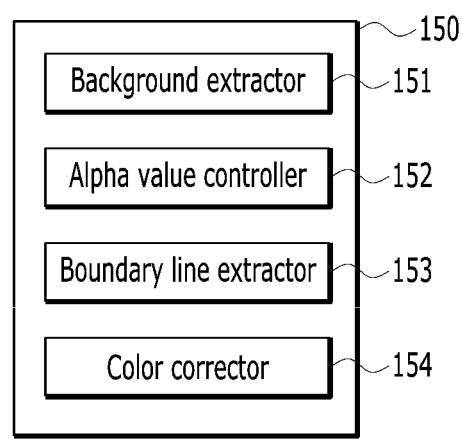
FIG. 4 is a block diagram illustrating functions of an image processor in accordance with at least one embodiment.
Figure 5:
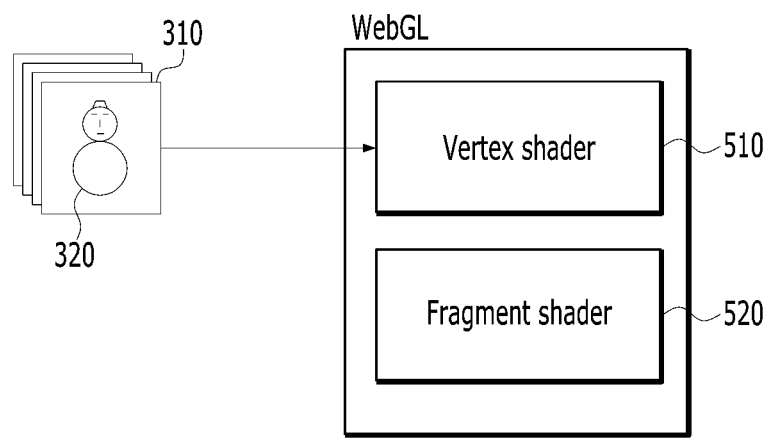
FIG. 5 is a diagram for explaining a method for extracting an image of a target object from each frame of a first video stream in accordance with at least one embodiment.
Figure 6:
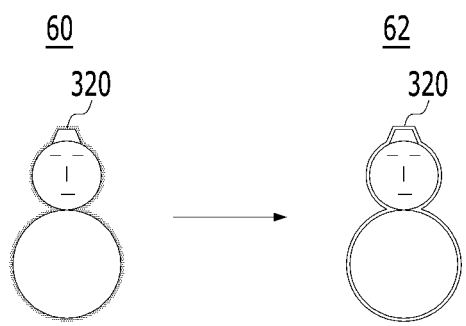
FIG. 6 is a diagram for correcting a color of a boundary line of a target object in accordance with at least one embodiment.

Hereinafter, functions and features of each constituent elements of set-top box 100 will be described with reference to FIG. 2 to FIG. 6. FIG. 2 is a block diagram illustrating a set-top box in accordance with at least on embodiment of the present disclosure. FIG. 3 is a diagram for explaining a method for creating an augment reality image (e.g., AR video stream) using a set-top box in accordance with at least one embodiment of the present disclosure. FIG. 4 is a block diagram illustrating functions of an image processor in accordance with at least one embodiment. FIG. 5 is a diagram for explaining a method for extracting an image of a target object from each frame of a first video stream in accordance with at least one embodiment. FIG. 6 is a diagram for correcting a color of a boundary line of a target object image in accordance with at least one embodiment.

Referring to FIG. 2, set-top box 100 may include communication circuit 110, input/output circuit 120, processor 130, memory 140, and image processor 150. Communication circuit 110 may communicate with other entities including server 300 and user device 200 through network 500. Communication circuit 110 may include at least one module (or at least one circuit) for communicating with other entities through a communication network. Herein, the communication network may include a variety of communication networks such as a wireless communication network and a wired communication network. Communication circuit 110 may include at least one of a wireless communication circuit and a wired communication circuit. Herein, the wireless communication circuit and wired communication may be separately or integrally configured.

In particular, communication circuit 110 may perform communication through a RF signal. Communication circuit 110 may convert a RF signal to a digital signal (e.g., electric signal) or a digital signal to a RF signal and transmit the converted signal through a communication network. Communication circuit 110 may include an antenna system, a RF transceiver, at least one of amplifiers, a tuner, at least one of oscillators, a digital signal processor, a CODEC chipset, a subscriber identity module (SIM) card, and a dedicated memory.

In accordance with at least one embodiment, communication circuit 110 may receive a first video stream 310 (e.g., in FIG. 3) from server 300 in real time. For example, the first video stream 310 may be included in a broadcasting signal transmitted from server 300, but not limited thereto. Communication circuit 110 may be an image including a target object 320 (shown in FIG. 3) to be composited with a second video stream 210 (shown in FIG. 3) from user device 200. The first video stream 310 may have a single-colored background. The target object 320 may be a person or a thing captured in each image frame of the first video stream 310 and captured in a studio, but not limited thereto. Herein, in a studio, a chroma back background is installed, and various objects are photographed or captured. For example, one of a blue screen, a red screen, and a green screen may be used as a chroma key background. In particular, the blue screen may be mainly used, but not limited thereto. Alternatively, the first video stream 310 may be produced by rendering a target object image with a single color background image. For convenience of description and ease of understanding, the first video stream is used as one image from server 200. However, the embodiments of the present disclosure are not limited thereto. For example, a single image having a target object with a single-color background may be received instead of the video stream from server 200 in accordance with another embodiment of the present disclosure.

In accordance with at least one embodiment, communication circuit 110 may receive a second video stream 210 captured by user device 200 in real time. The second video stream 210 may be a live video stream captured in real time by user device 200.

Input/output circuit 120 may perform receiving your inputs through a predetermined graphic user interface displayed on display 400 as a result of executing a predetermined software program installed in set-top box in response to a user input and outputting a result of processing data based on the user inputs to a predetermined output device, such as display 400. In accordance with at least one embodiment, input/output circuit 120 may receive a user selection input for selecting at least one of video streams stored in server 300 and/or user device 200. Furthermore, input/output circuit 120 may output the created augmented reality video stream to display 400.

Processor 130 may perform or control overall operation of set-top box 100. For example, processor 120 may be a central processing circuitry that controls constituent elements (e.g., memory, communication circuit, etc.) of set-top box 100 and/or performs a variety of operations (or functions) of set-top box 100. Processor 130 may perform operations for creating an augmented reality video stream using two video streams from different sources in cooperation with image processor 150.

Memory 140 may store a variety of information, such as software programs for operation, data received from other entities, and data generated as result of operations. That is, memory 140 may store an operation system data, applications, and related data, received from other entities through a variety of communication media (e.g., communication networks). Memory 140 may include at least one of an internal memory and an external memory according to embodiments. For example, memory 140 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Image processor 150 may mainly perform operations for compositing two different video streams or one image into a video stream in order to create an augmented reality video stream in cooperation with processor 130. In particular, image processor 150 may extract an object from each frame of the first video stream 310 using a WebGL and correct a color of a boundary line of the object between the object and the background.

The WebGL is a Java script library for rendering 3D and 2D graphics that are interactive in a web-browser without using a plug-in. Such a WebGL may be previously installed or stored in set-top box 100 and interact with other applications for creating an AR video stream in accordance with at least one embodiment.

Referring to FIG. 4, image processor 150 may include functional units such as background extractor 151, alpha value controller 152, boundary extractor 153, and color corrector 154. Background extractor 151 may determine a color of each picture in each frame of the first video stream using a vertex shader 510 of the WebGL and distinguish an object region and a background region from the first video stream based on the determined color.

As shown in FIG. 5, alpha value controller 152 may control an alpha value of each picture in an extracted background region using a fragment shader 520 of the WebGL. For example, alpha value controller 312 may set an alpha value of each pixel in the background region as 0.

Hereinafter, an algorithm for controlling an alpha value of each pixel in a background region, which is performed by the fragment shader 520 of WebGL.

Algorithm 1:

```
vec4 chromakey_func(vec4 color ){
    vec4 key = vec4(0.30, 0.87, 0.63, 1.0);
    float minDistance = 0.1;
    float maxDistance = 0.1;
    vec4 delta = color - key;
    float distance2 = dot(delta, delta);
        float weight = clamp( (distance2 - minDistance ) /
(maxDistance - minDistance), 0.0, 1.0);
    vec4 transparent = color;
        transparent.w = 0.0;
    return mix(transparent, color, weight);
}
```

Referring to FIG. 6, a diagram 60 shows target object 320 extracted from the first video stream 310. As shown, RGB values of a boundary line are changed because its color is mixed with a background color. In order to correct such a problem, boundary extractor 133 extracts a boundary line (e.g., green boundary line) between the target object 320 and the background in the first video stream 310 and extracts pixels adjacent to the boundary line.

Color corrector 134 may reduce one of a red value, a green value, and a blue value, which is corresponding to a RGB value of a pixel adjacent to the boundary line as much as a predetermined rate. For example, color corrector 134 may reduce a green value of the pixels adjacent to the boundary line as much as 40% when the background color is a green. If the background color is eliminated from the boundary line of the target object 320, the target object 320 may be look more sharp and clear.

An algorithm for extracting the boundary line and correcting the RGB value of the pixels are shown below.

Algorithm 2:

```
void main( ){
    vec4 texelColor=texture2D(uSampler, vTextureCoord);
    int xIndex = 0;
    int yIndex = 0;
    int chromakeyCount = 0;
    vec3 bgColor = vec3(20.0/255.0, 255.0/255.0, 9.0/255.0);
    float __xpixel = 1.0/1920.0;
    float __ypixel = 1.0/1080.0;
```

Algorithm 2:

```
    vec2 startCoord = vec2(vTextureCoord.x - __xpixel*2.5,
vTextureCoord.y - __ypixel*2.5);
    vec4 result = texelColor;
    for(xIndex = 0; 5 > xIndex: xIndex++){
        vec2 pixelCoord;
        pixelCoord.x = startCoord.x + __xpixel*float(xIndex);
        pixelCoord.y = startCoord.y + __ypixel*float(yIndex);
        vec4 color = texture2D(uSampler, pixelCoord);
        vec4 result = chromakey_func(color );
        if(1.0 > result.a )
        {
        chromakeyCount++;
        }
    }
    vec4 resultColor = chromkey_func(texelColor );
    if((chromakeyCount > 3) && (22 > chromakeyCount )){
        resultColor.g = resultColor.g*0.6;
    }
    gl_FragColor = resultColor;
```

Referring back to FIG. 2 and FIG. 3, image processor 150 may composite extracted target object image 320 to each frame of the second video stream 210.

For example, image processor 150 may receive an input from a user in order to set a composition position of the target object 320 through a predetermined graphic user interface and control a position of the target object 320 to be composited to the second video stream 210 based on the input.

Image processor 150 may create a resultant AR video stream by compositing the target object image at a selected composition position of the second video stream. Input/output circuit 140 may output the created resultant AR video stream to display 400.

Hereinafter, operations of set-top box 100 for creating an augment reality video stream in accordance with at least one embodiment with reference to FIG. 7 to FIG. 9.

Figure 7:
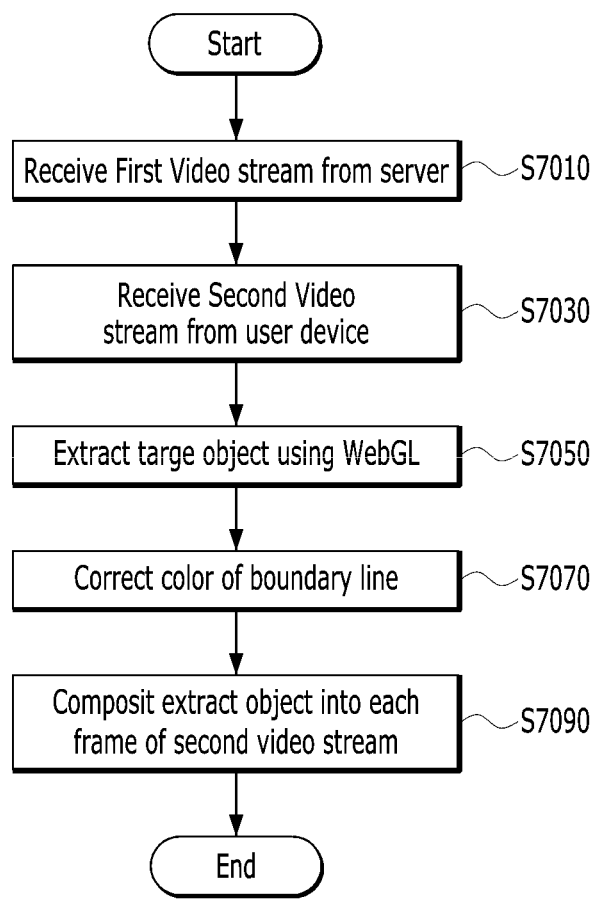
FIG. 7 is a flowchart illustrating a method for creating an augment reality in real time using a set-top box in accordance with at least one embodiment.

FIG. 7 is a flowchart illustrating a method for creating an augment reality video stream using a set-top box in accordance with at least one embodiment.

Referring to FIG. 7, set-top box 100 may receive a first video stream from server 300 in real time at step S7010. The first video stream may include images of a target object with a single colored background. At step S7030, set-top box may receive a second video stream from user device 200 in real time. As described, communication circuit 110 of set-top box 100 may receive a first video stream 310 from server 300 in real time. The first video stream 310 may include an image of a target object 320 to be composited with a second video stream 210 from user device 200. The first video stream may have a single-colored background. The target object 320 may be a person or a thing captured in each image frame of the first video stream 310 and captured in a studio. Herein, in the studio, a chroma key background may be installed. The target object is located in the front of the chroma key background and photographed or captured. For example, one of a blue screen, a red screen, and a green screen may be used as a background chroma back. In particular, the blue screen may be mainly used. Furthermore, communication circuit 110 may receive a second video stream 210 captured by user device 200 in real time. The second video stream 210 may be a live video stream captured in real time by user device 200.

At step S7050, set-top box may extract a target object from each frame of the first video stream using WebGL. At step S7070, set-top box may correct a color of a boundary line of the extracted target object between the target object and the background. For example, image processor 150 may extract an object from each frame of the first video stream 310 using a WebGL and correct a color of a boundary line of the object between the object and the background. Such operation will be described more detail with reference to FIG. 8 and FIG. 9.

At step S7090, set-top box may composite the extracted target object into each frame of the second video stream. At step S7110, set-top box may output the composited video stream to display. For example, image processor 150 may receive an input from a user in order to set a composition position of the target object 320 and control a position of the target object 320 to be composited to the second video stream 210 based on the input. Image processor 150 may create a resultant AR video stream by compositing the target object image at a selected composition position of the second video stream. Input/output circuit 140 may output the created resultant AR video stream to display 400.

Hereinafter, extracting a target object image from the first video stream will be described in more detail. FIG. 8 is a flowchart illustrating a method for extracting a target object from each frame of a first video stream by a set-top box in accordance with at least one embodiment.

Figure 8:
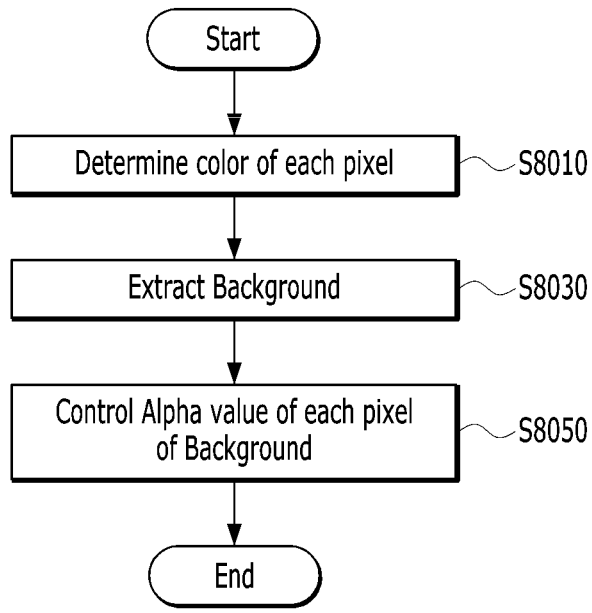
FIG. 8 is a flowchart illustrating a method for extracting a target object from each frame of a first video stream by a set-top box in accordance with at least one embodiment.

Referring to FIG. 8, set-top box 100 may determine a color of each pixel in each frame of first video stream using WebGL at step S8010. At step S8030, set-top box 100 may distinguish a background from a first video stream based on the determined color. At step S8050, set-top box 100 may eliminate the background by controlling an alpha value of each pixel of the distinguished background from the first video stream and extract the target object from the first video stream.

In accordance with at least one embodiment, background extractor 151 of image processor 150 may determine a color of each picture in each frame of the first video stream using a vertex shader 510 of the WebGL and distinguish an object region and a background region from the first video stream based on the determined color. As shown in FIG. 5, alpha value controller 152 may control an alpha value of each picture in an background region using a fragment shader 520 of the WebGL. For example, alpha value controller 312 may set an alpha value of each pixel in the background region as 0. As described, the algorithm 1 may be used to set an alpha value of each pixel in the background region.

Hereinafter, correcting a boundary line will be described in more detail with FIG. 9. FIG. 9 is a flowchart illustrating a method for correcting a boundary line between a target object and a background using a set-top box in accordance with at least one embodiment.

Figure 9:
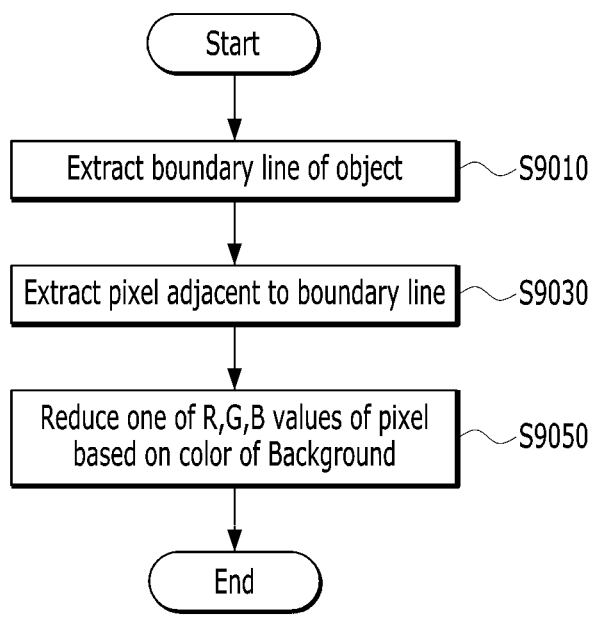
FIG. 9 is a flowchart illustrating a method for correcting a boundary line of a target object image using a set-top box in accordance with at least one embodiment.

Referring to FIG. 9, set-top box 100 may extract a boundary line of a target object extracted from each frame of a first video stream, at step S9010.

At step S9030, set-top box 100 may extract a pixel adjacent to the boundary line. At step S9050, set-top box 100 may reduce one of a red value, a green value, and a glue value of the pixel, corresponding to a single color of the background, as much as a predetermined rate.

As described in FIG. 4 and FIG. 5, boundary extractor 153 of image processor 150 extracts a boundary line (e.g., green boundary line) between the target object 320 and the background in the first video stream 310 and extracts pixels adjacent to the boundary line. Color corrector 154 of image processor 150 may reduce one of a Red value, a green value, and a blue value, which is corresponding to a RGB value of a pixel adjacent to the boundary line as much as a predetermined rate. For example, color corrector 134 may reduce a green value of the pixels adjacent to the boundary line as much as 40% when the background color is a green. If the background color is eliminated from the boundary line of the target object 320, the target object 320 may be look more sharp and clear. Boundary extractor 153 and color corrector 154 may use the algorithm 2 for extracting the boundary line and correcting the RGB value of the pixels.

As described, set-top box 100 in accordance with at least one embodiment has the improved function for efficiently creating an AR video stream or an AR image without requiring the expensive chroma key system and without requiring high processing power. In addition, set-top box 100 has the improved function for creating the AR video stream in higher quality by using the WebGL to extract a target object image from a video stream and correct a boundary line of the target object in the image.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for creating an augmented reality (AR) video using a set-top box, the method comprising:
   receiving, by the set-top box, a first video stream including a target object image in real time from a server;
   receiving, by the set-top box, a second video stream from a user device in real time wherein the second video stream is captured by the user device;
   extracting, by the set-top box, the target object image from each frame of the first video stream using a chromakey function in a web graphics library (WebGL), wherein the chromakey function controls an alpha value of each pixel in a background;
   correcting, by the set-top box, a color of a boundary line of the target object image between the target object and the background by reducing one of a red value, a green value, and a blue value of pixels adjacent to the boundary line in the background by a predetermined rate;
   receiving, by the set-top box, an input indicating a composition position of the target object at the second video stream through a predetermined graphic user interface; and
   creating, by the set-top box, the AR video by compositing the extracted target object image into an each frame of the second video stream at the composition position of the second video stream.

2. The method of claim 1, wherein a color of the background is a single color.

3. The method of claim 2, wherein the correcting comprises: extracting the boundary line; and extracting the pixels adjacent to the boundary line.

4. The method of claim 3, wherein the correcting comprises: determining one of the red value, the green value, and the blue value of each pixel corresponding to a RGB value of the background; and reducing the determined one by the predetermined rate.

5. The method of claim 1, wherein the extracting comprises:
   determining a color of each pixel from each frame of the first video stream; and
   distinguishing the background from the target object image based on the determination result.

6. The method of claim 1, further comprising:
   outputting the composited video stream as the video augmented reality to a display.

7. A set-top box for creating an augmented reality (AR) video, comprising:
   a communication circuit configured to receive a first video stream including a target object image in real time from a server and to receive a second video stream captured in real time by a user device from the user device; and
   a processor configured to:
      extract the target object image from each frame of the first video stream using a chromakey function in a web graphic library (WebGL), wherein the chromakey function controls an alpha value of each pixel in a background,
      correct a color of a boundary line of the target object image between the target object and the background by reducing one of a red value, a green value, and a blue value of pixels adjacent to the boundary line in the background by a predetermined rate,
      receive an input indicating a composition position of the target object at the second video stream through a predetermined graphic user interface, and
      composite the extracted target object image into an each frame of the second video stream.

8. The set-top box of claim 7, wherein a color of the background is a single color.

9. The set-top box of claim 8, wherein the processor is configured to extract the boundary line and extract the pixels adjacent to the boundary line.

10. The set-top box of claim 9, wherein the processor is configured to:
    determine one of the red value, the green value, and the blue value of each pixel corresponding to a RUB value of the background; and reduce the determined one by the predetermined rate.

11. The set-top box of claim 7, wherein the processor is configured to:
  determine a color of each pixel from each frame of the first video stream; and
  distinguish the background from the target object image based on the determination result.

12. The set-top box of claim 7, further comprising an input/output circuit configured to output the composited video stream as the video augmented reality to a display.

13. A non-transitory computer-readable storage medium storing a program for performing a method for creating an augmented reality (AR) video using a set-top box, the method comprising:
  receiving, by the set-top box, a first video stream including a target object image in real time from a server;
  receiving, by the set-top box, a second video stream from a user device in real time wherein the second video stream is captured by the user device;
  extracting, by the set-top box, the target object image from each frame of the first video stream by performing a chromakey function in a web graphics library (WebGL), wherein the chromakey function controls an alpha value of each pixel in a background region;
  correcting, by the set-top box, a color of a boundary line of the target object image between the target object and the background by reducing one of a red value, a green value, and a blue value of pixels adjacent to the boundary line in the background by a predetermined rate;
  receiving, by the set-top box, an input indicating a composition position of the target object at the second video stream through a predetermined graphic user interface; and
  creating, by the set-top box, the AR video by compositing the extracted target object image into an each frame of the second video stream at the composition position of the second video stream.

14. The non-transitory computer-readable storage medium of claim 13, wherein a color of the background is a single color.

15. The non-transitory computer-readable storage medium of claim 14, wherein the correcting comprises: extracting the boundary line and extracting the pixels adjacent to the boundary line.

16. The non-transitory computer-readable storage medium of claim 15, wherein the correcting comprises: determining one of the red value, the green value, and the blue value of each pixel corresponding to a RGB value of the background; and
  reducing the determined one by the predetermined rate.

17. The non-transitory computer-readable storage medium of claim 13, wherein the extracting comprises:
  determining a color of each pixel from each frame of the first video stream; and
  distinguishing the background from the target object image based on the determination result.

* * * * *

UNITED STATES PATENT AND TRADEMARK OFFICE
CERTIFICATE OF CORRECTION

PATENT NO. : 11,151,747 B2
APPLICATION NO. : 16/359039
DATED : October 19, 2021
INVENTOR(S) : Yeong-Hwan Jeong et al.

Page 1 of 1

It is certified that error appears in the above-identified patent and that said Letters Patent is hereby corrected as shown below:

In the Claims

In Claim 10, Column 12, Line 65, please replace "a RUB value" with --a RGB value--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*